United States Patent [19]

Kloosterhouse et al.

[11] Patent Number: 5,191,255
[45] Date of Patent: Mar. 2, 1993

[54] ELECTROMAGNETIC MOTOR

[75] Inventors: George Kloosterhouse, Malabar, Fla.; Gerard Paquette, Isle of Man, United Kingdom

[73] Assignee: Magnetospheric Power Corp. Ltd., Turks and Caicos Isls.

[21] Appl. No.: 656,798

[22] Filed: Feb. 19, 1991

[51] Int. Cl.$^5$ .............................. H02K 21/12
[52] U.S. Cl. ........................ 310/156; 310/68 R; 310/179; 310/268
[58] Field of Search ............... 310/266, 268, 156, 688, 310/179, 180, 181, 184, 185, 42, 89, 91, 258, 67 R, 254, 261, 112, 68 R

[56] References Cited

U.S. PATENT DOCUMENTS

| | | | |
|---|---|---|---|
| 2,993,156 | 7/1961 | Devol | 318/254 |
| 3,646,376 | 2/1972 | Anderson | 310/156 |
| 3,696,260 | 10/1972 | Lace | 310/156 |
| 3,784,850 | 1/1974 | Inaba | 310/268 |
| 3,803,433 | 4/1974 | Ingenito | 310/156 |
| 4,358,697 | 11/1982 | Liu | 310/156 |
| 4,459,501 | 7/1984 | Fawzy | 310/156 |
| 4,565,938 | 1/1986 | Fawzy | 310/156 |
| 4,625,135 | 11/1986 | Kasabian | 310/156 |
| 4,701,656 | 10/1987 | Fawzy | 310/254 |
| 4,710,667 | 12/1987 | Whiteley | 310/268 |
| 4,806,834 | 2/1989 | Koenig | 310/156 |
| 4,814,654 | 3/1989 | Gerfast | 310/154 |
| 4,837,474 | 6/1989 | Petersen | 310/254 |
| 4,874,976 | 10/1989 | Ohsawa | 310/268 |
| 4,922,145 | 5/1990 | Shtipelman | 310/268 |
| 4,996,457 | 2/1991 | Hawsey | 310/212 |
| 5,038,065 | 8/1991 | Matsubayashi | 310/156 |

Primary Examiner—R. Skudy
Attorney, Agent, or Firm—Evenson, Wands, Edwards, Lenahan & McKeown

[57] ABSTRACT

An electromagnetic motor includes a rotor having a plurality of magnets mounted along a perimeter of the rotor. Preferably, adjacent magnets have opposite poles facing outward. One or more electromagnets are disposed adjacent to the perimeter of the rotor so that as the rotor rotates, the magnets mounted on the rotor are carried near the poles of the electromagnets. Current is supplied to the electromagnets by a drive circuit in a predetermined phase relationship with the rotation of the rotor such that, for substantially all angular positions of the rotor, magnetic attraction and repulsion between the poles of the electromagnets and the magnets mounted on the rotor urge the rotor to rotate in a desired direction. Reflective material is mounted on the rotor in predetermined angular positions. The drive circuit includes a photosensitive device which produces a signal whose value varies according to whether the device is receiving light reflected from the reflective material. The signal is amplified to produce drive current for the electromagnets.

11 Claims, 7 Drawing Sheets

ELECTROMAGNETIC MOTOR

BACKGROUND AND SUMMARY OF THE INVENTION

This invention relates to the field of electromagnetic motors, and specifically to electromagnetic motors in which rotors having permanent magnets mounted thereon are rotated by means of alternating phase currents supplied to electromagnet stators.

An object of the invention is to provide mechanical motive power. An additional object of the invention is to provide high speed mechanical motive power, wherein electrical input power consumption is reduced as mechanical speed of rotation increases.

In order to realize these and other objectives, an apparatus in accordance with the invention is provided comprising a rotor having a perimeter, a plurality of magnets mounted on the perimeter of the rotor, an electromagnet disposed adjacent to the perimeter of the motor, and means for magnetizing the electromagnet and for changing a polarity of the electromagnet in a predetermined phase relationship with rotation of the rotor, whereby magnetic attraction and repulsion between the electromagnet and the plurality of magnets cause the rotor to rotate.

BRIEF DESCRIPTION OF THE DRAWINGS

Other objects, advantages and novel features of the present invention will become apparent from the following detailed description of the invention when considered in conjunction with the accompanying drawings, in which.

DETAILED DESCRIPTION OF THE INVENTION

Figure 1:
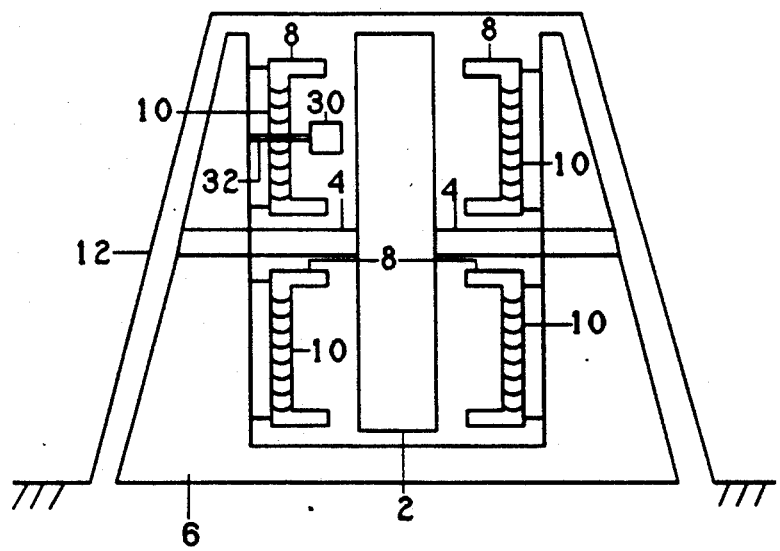
FIG. 1 is a front view of an apparatus according to the invention.

FIG. 1 shows a front view of an apparatus according to the invention. A disk-shaped rotor shown in an edge view, is supported by and rotates about an axle 4. The rotor 2 is preferably made of a non-magnetically conductive material such as a neodymium iron boron alloy. The axle 4 is supported in a base 6 at its ends. One or more electromagnets 8 are mounted by suitable means so that they are disposed near the rotor 2. While four electromagnets 8 are shown in FIG. 1, any suitable number may be employed. Also, while the electromagnets 8 may all be disposed on a same side of the rotor 2, in the present embodiment in FIG. 1, electromagnets 8 are disposed on either side of the rotor 2. In a preferred embodiment, the electromagnets are U-shaped. Coils 10 are wound around the electromagnets 8. As will be described in detail below, suitable electric current is provided to the coils 10 to cause magnetic fields to be induced in the electromagnets 8. Depending on the direction of the current through a coil 10, a given end of an electromagnet 8 may be either a north pole or a south pole. A grounded shield 12 may be employed to enclose the entire apparatus.

Figure 2:
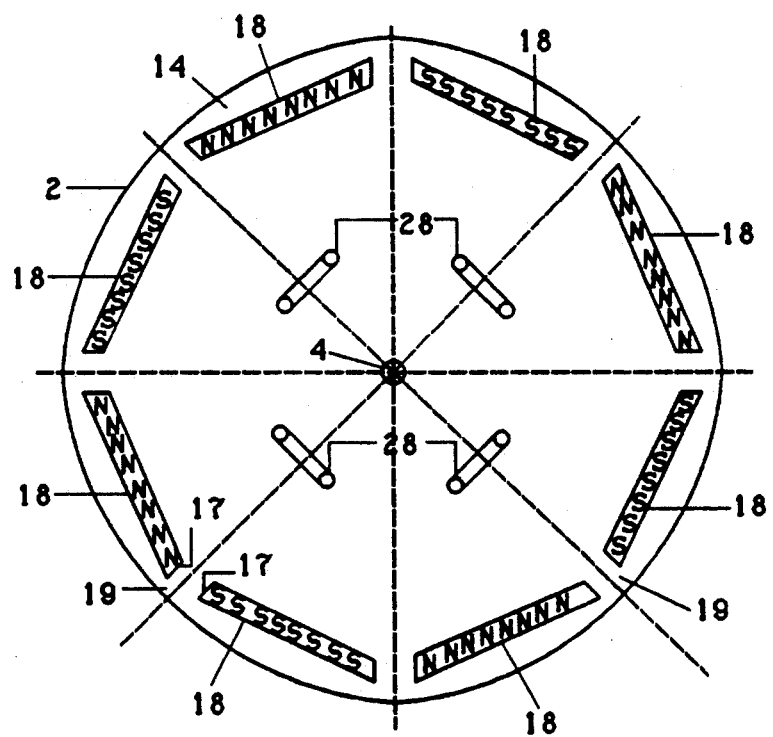
FIG. 2 is a side view of a rotor used in the apparatus of FIG. 1.
Figure 3:
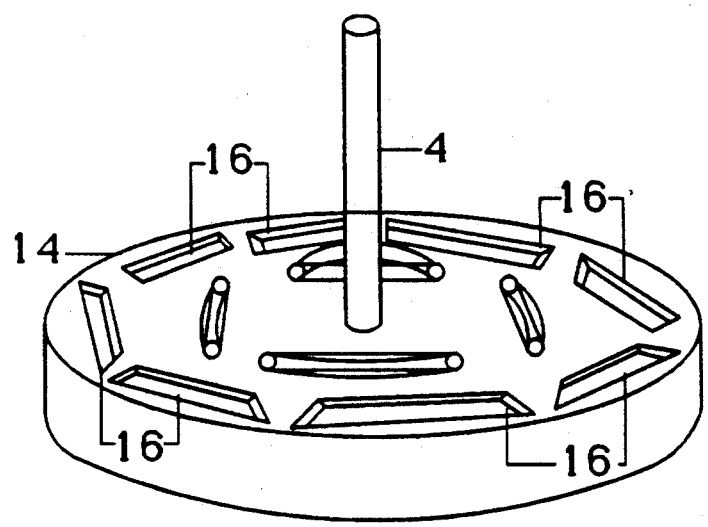
FIG. 3 is a perspective view of the rotor of FIG. 2.

FIGS. 2 and 3 show a more detailed view of the rotor 2 according to a first preferred embodiment of the invention. FIG. 2 shows a side view of the rotor 2, and FIG. 3 shows a perspective view of the rotor 2. Around a perimeter 14 of the rotor 2, a plurality of slots 16 are provided. In the preferred embodiment, the slots are arranged around the perimeter 14 end-to-end to suggest the shape of a polygon. In the illustrated embodiment, 8 slots are shown, thus suggesting the shape of an octagon. As may be seen more clearly in the illustration of FIG. 3, the slots extend partly through the rotor 2. The slots accommodate permanent magnets which are mounted to the rotor 2 and rotate therewith. Preferably the slots 16 may be trapezoidal in shape.

Figure 4:
FIG. 4 is a top view of a magnet used in the rotor of FIGS. 2 and 3.
Figure 5:
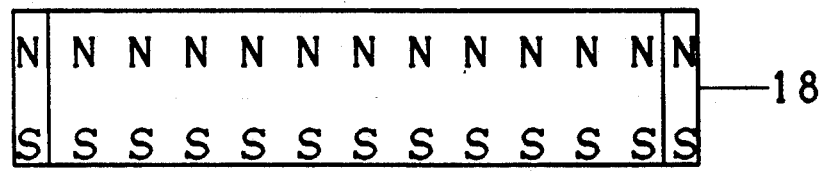
FIG. 5 is a side view of the magnet of FIG. 4.

FIGS. 4 and 5 show top and side views, respectively, of a permanent magnet 18 which may be inserted in the slots 16. The magnet is shaped as a trapezoidal prism. The top view as shown in FIG. 4, shows a trapezoidal shape. In FIG. 4, the top and bottom boundaries of the magnet are parallel, and the left and right sides are slightly farther apart at the top than at the bottom. Accordingly, as shown more clearly in FIG. 2, the a series running end-to-end around the perimeter 14 of the rotor 2.

While trapezoidal shapes are shown, other shapes may be employed. For instance, the magnets may be in a standard rectangular shape. Generally, it is preferred that the magnets 18 have two elongated opposing faces which serve as magnetic poles. The magnets are inserted into the slots 16 or otherwise mounted onto the rotor 2 such that a desired one of the poles faces outward. Thus, a magnetic dipole axis running through the two poles of one of the magnets 18 will be approximately parallel to an axis of rotation of the rotor 2. Also, while eight magnets 18 on each side of the rotor 2 are shown, the number of magnets 18 used may vary depending on factors such as the size of the overall structure.

As will be described below, magnetic attraction and repulsion between the magnets 18 and the electromagnets 8 produce a push-pull effect which causes the rotor 2 to rotate in a desired direction, either clockwise or counterclockwise. The longer the magnets 18 are from end-to-end, the longer the duration of each push and each pull. Thus, the power of the electromagnetic motor according to the invention is related to the length of the magnets 18. In the preferred, embodiment, eight or the magnets 18 are disposed in a generally end-to-end fashion around the perimeter of the rotor 2, so each magnet 18 has a length proximately corresponding to 45° of the circumference of the rotor 2, but with a spacing 19 between adjacent ends 17 of a adjacent magnets, as shown in FIG. 2. However, a different number of magnets could be similarly employed. For instance, six magnets disposed end-to-end around the perimeter of the rotor suggesting the shape of a hexagon could be used. In such an embodiment, each magnet 18 would have a length corresponding to 60° of the circumference of the rotor 2. The power of such a device would be correspondingly increased relative to a device having eight magnets.

Returning to FIG. 5, it will be seen that each trapezoidal face of the trapezoidal prism is a pole of the magnet 18. FIG. 5 shows that the upper portion of the magnet is the north pole. The letter N is repeated along the length of the view of FIG. 5 to indicate that the upper portion, in its entirety, is the north pole. Similarly, the lower portion of the view of FIG. 5 is the south pole. Since FIG. 4 is a top view and FIG. 5 is a side view of the magnet 18, it will be understood that the view of FIG. 4 is an end-on view of the north pole. In accordance with the invention, magnets 18 are inserted in the slots 16 such that the outward facing surface of any given magnet, in its entirety, is one pole of the magnet. The inner facing surface is the other pole of the magnet.

Figure 6:
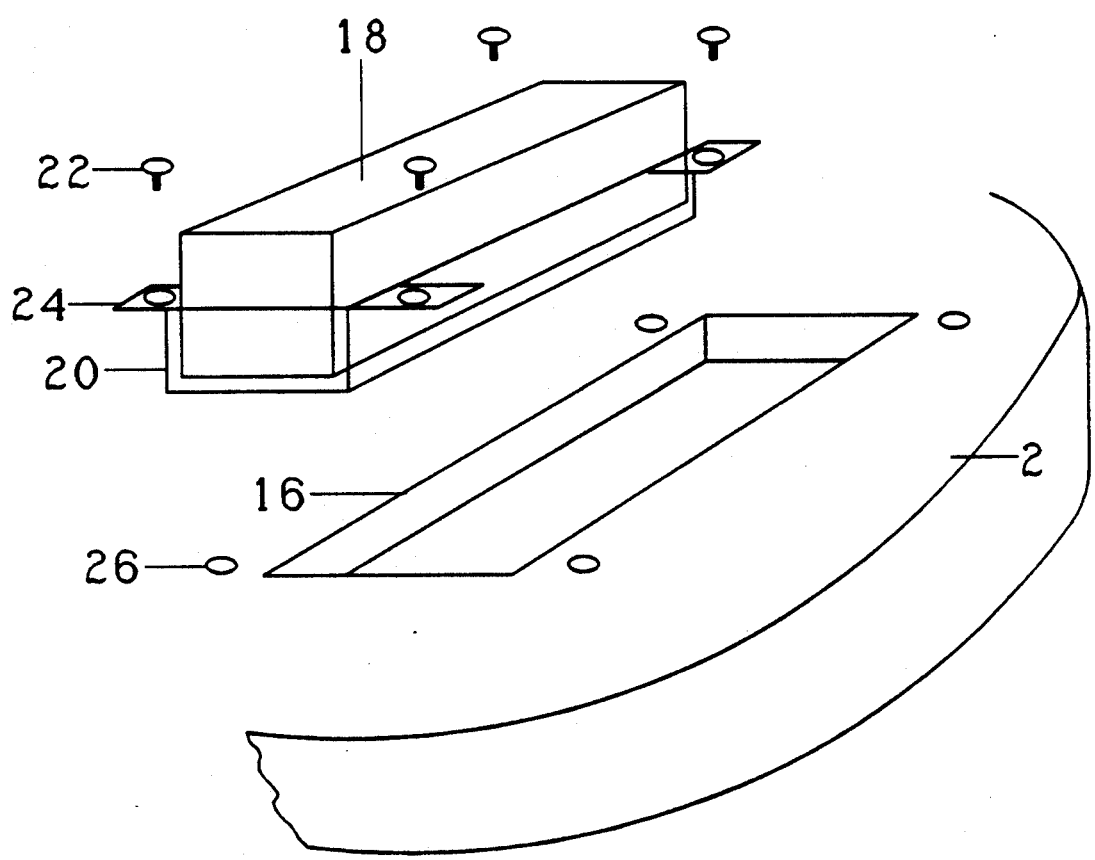
FIG. 6 is a perspective view of a magnet, a mounting apparatus, and a portion of a rotor in accordance with the second embodiment of the invention.

FIG. 6 shows a partial exploded view of a portion of the rotor 2 according to a second embodiment of the invention. A permanent magnet 18 substantially similar to that of FIGS. 4 and 5 is bonded to a tray 20. The tray 20 accommodates fasteners 2 for removably fastening the tray 20 to the rotor 2. In the embodiment in FIG. 6, the fasteners 22 are screws. A slot 16 is provided for accommodating the magnet 18 inside the tray 20. However, the slot 16 may be omitted if a flush mounted tray is employed. In the illustrated embodiment, the fasteners 22 are inserted through holes in tabs 24 on the tray 20 to holes 26 in the rotor 2. The holes 26 may have screw threads. Accordingly, a magnet bonded to a tray may be quickly and easily removed or replaced.

Returning to FIG. 2, it will be noted that, in the preferred embodiment, magnets 18 are inserted in the slots of the rotor 2 (or otherwise mounted) such that, in sequence around the perimeter 14, alternating poles are facing outward.

FIG. 2 also shows a plurality of regions on the surface of the rotor 2 which bear reflective material 28. The reflective material 28 is preferably disposed at a radial distance from the axis 4 such that, as the rotor 2 rotates, at a given fixed position relative to the axis 4, alternating regions of reflective material and regions lacking reflective material on the rotor 2 are adjacent to the given position. The reflective material 28 may be used in conjunction with a photosensitive device for determining an angular position of the rotor 2.

FIG. 1 shows in schematic form, a photosensitive device 30 which is supported by a suitable supporting means 32 mounted to the frame 6, such as a bracket or arm. The photosensitive device 30 may be a photocell, photodiode, phototransistor, or other suitable electronic device. As the rotor 2 rotates, an output signal from the photosensitive device 30 will vary between two different values, depending upon whether a portion of the reflective material 28 is adjacent to the photosensitive device 30. The output signal may be employed to control the polarity of current supplied through the coils 10 to the electromagnets 8, as described below. The output signal may also be used for other suitable purposes such as for providing an input signal to a tachometer.

Figure 7:
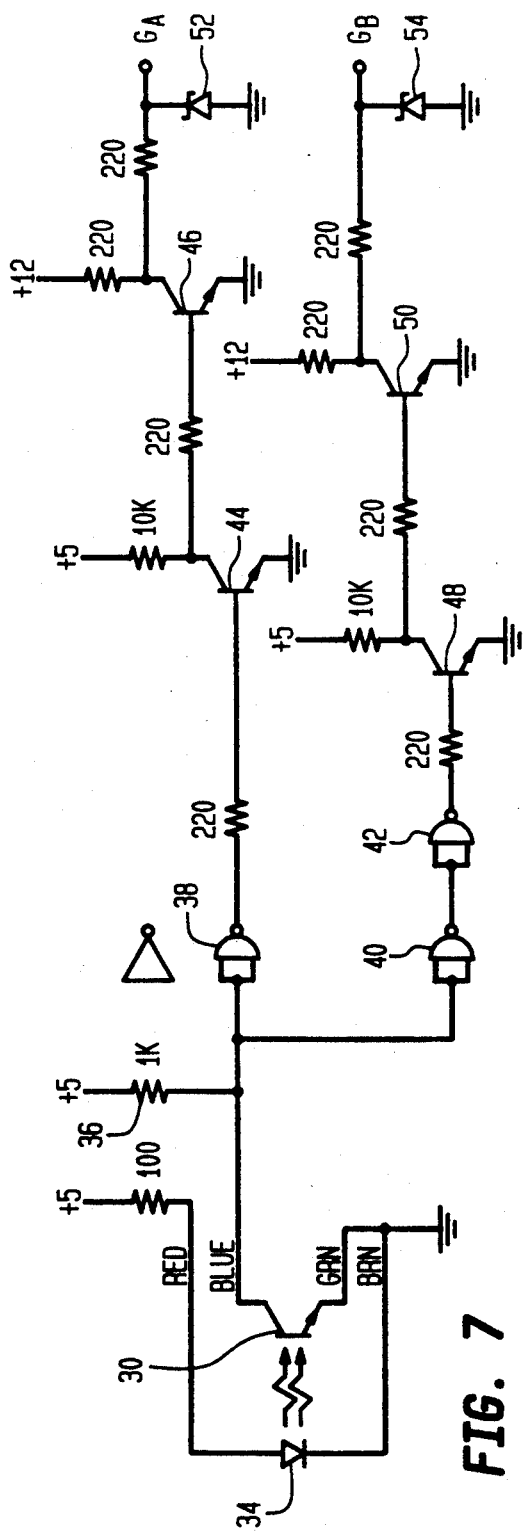
FIG. 7 is a schematic diagram of a circuit for producing signals for energizing the electromagnets of the apparatus of FIG. 1.

Turning now to FIG. 7 there is shown a schematic diagram of a drive circuit including the photosensitive device 30 of FIG. 1, and additional circuitry for providing drive current to the coils 10 of the electromagnets 8. The photosensitive device 30 is shown as a phototransistor which conducts current according to the amount of light which impinges on it. A light emitting diode (LED) 34 is mounted adjacent to the phototransistor 30. The LED 34 may also be mounted on the supporting means 32 shown in FIG. 1, or may be otherwise supported. The LED 34 directs a beam of light against the surface of the rotor 2. During time intervals when the reflective material 28 is adjacent to the phototransistor 30 and the LED 34, the light is reflected onto the phototransistor 30, causing it to conduct current. A resistor 36 is connected between a power supply voltage and the collector of the phototransistor 30. Accordingly, a voltage at the collector of the phototransistor 30 varies between high and low values depending on whether light from the LED 34 is reflecting off a portion of the reflective material 28.

The collector of the transistor 30 is coupled to inputs of logic gates 38, 40. The logic gate 40 has an output which is coupled to an input of a logic gate 42. The logic gates 38, 40, 42, are shown as two-input NAND gates. It is common practice to employ a multi-input inverted-output gate such as a two-input NAND gate as an inverter by coupling an input signal to all of the inputs and the NAND gate. While a wide variety of logic devices may be used in place of the logic gates 38, 40, 42, the objective here is to provide two output signals which follow the collector of the phototransistor 30 and which are in opposite logic states.

Outputs of the logic gates 38, 42 are coupled to amplifiers. Each amplifier is shown as having two transistor stages. The amplifier coupled to the output of the logic gate 38 includes transistors 44, 46, and the amplifier coupled to the output of the logic gate 42 includes the transistors 48, 50. Outputs of the amplifiers at the collectors of the transistors 46 and 50 are coupled through resistors to cathodes of Zener diodes 52, 54, respectively. The Zener diodes 52, 54 are coupled such that, when a high voltage is received from the transistors 46 or 50, the Zener diodes will be reverse biased, and will thus serve as voltage regulators in accordance with their reverse bias breakdown voltages. Outputs of the circuit of FIG. 7 are shown as $G_A$ and $G_B$ respectively. Signals appearing at these outputs vary between high and low voltage states in accordance with whether a piece of reflective material 28 is adjacent to the phototransistor 30.

Figure 8:
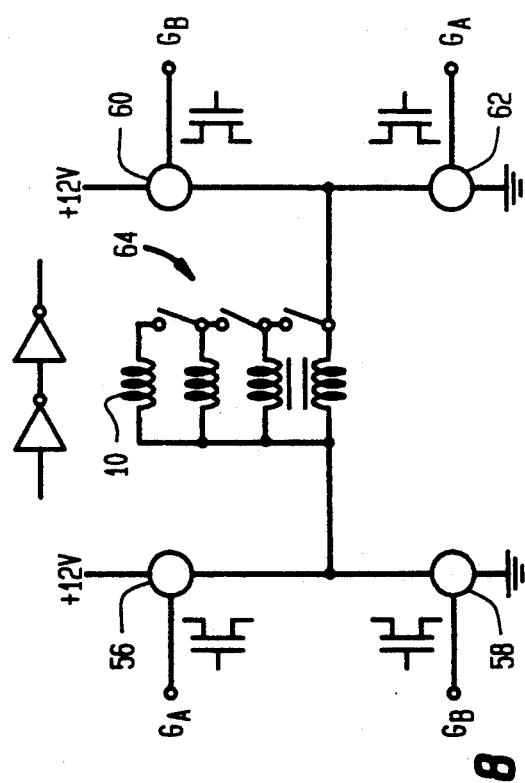
FIG. 8 is a schematic diagram showing the electromagnets of the apparatus of FIG. 1, along with additional circuitry for driving the electromagnets.

FIG. 8 is a schematic representation of the coils 10 of the electromagnets 8. Additional drive circuitry is shown, which is coupled to receive the voltages $G_A$ and $G_B$ from the circuit of FIG. 7. The drive circuit provides current to the coils 10. The direction of the current through the coils 10 is determined by which of the signals $G_a$ or $G_b$ is high.

The portion of the drive circuit shown in FIG. 8 includes four power MOSFETs (metal oxide-semiconductor field effect transistors) 56, 58, 60, 62. As shown, drains of the power MOSFETs 56, 60 are coupled to a power supply, which produces a suitable supply voltage, such as 12, 24 or 36 volts, and sources of the power MOSFETs 58, 62 are coupled to ground. Sources of the power MOSFETS 56, 60 are coupled to drains of the power MOSFETS 58, 62, respectively. The source of the power MOSFET 56 is also coupled to a first end of each of the coils 10. The coils 10 are coupled in parallel, as shown. Switches collectively labeled as 64 are provided between the second ends of each of the coils 10 so that one or more of the coils 10 may be disconnected from the circuit by opening the appropriate switch 64. Thus, certain ones of the coils may normally be left disconnected, but may be connected as necessary to provide extra power. The second end of the first coil and of an subsequent coils 10 coupled by means of these switches 64 are coupled to the source of the power MOSFET 60.

When a reflective material 28 is adjacent to the phototransistor 30, $G_A$ is high and $G_B$ is low. Accordingly, current flows from the drain to the source of the power MOSFET 56, through the coils 10, from the drain to the source of the power MOSFET 62, to ground. The power MOSFETs 58, 60 do not conduct current at this time. When a non-reflective area is adjacent to the phototransistor 30 $G_A$ is low and $G_B$ is high. Accordingly, current flows from the power supply from the drain to the source of the power MOSFET 60, through the coils 10, from the drain to the source of the power MOSFET 58, to ground. In this latter situation, current flows through the coils 10 in the opposite direction as in the former case. Accordingly, the polarity of the electromagnets 8 is reversed.

Figure 9:
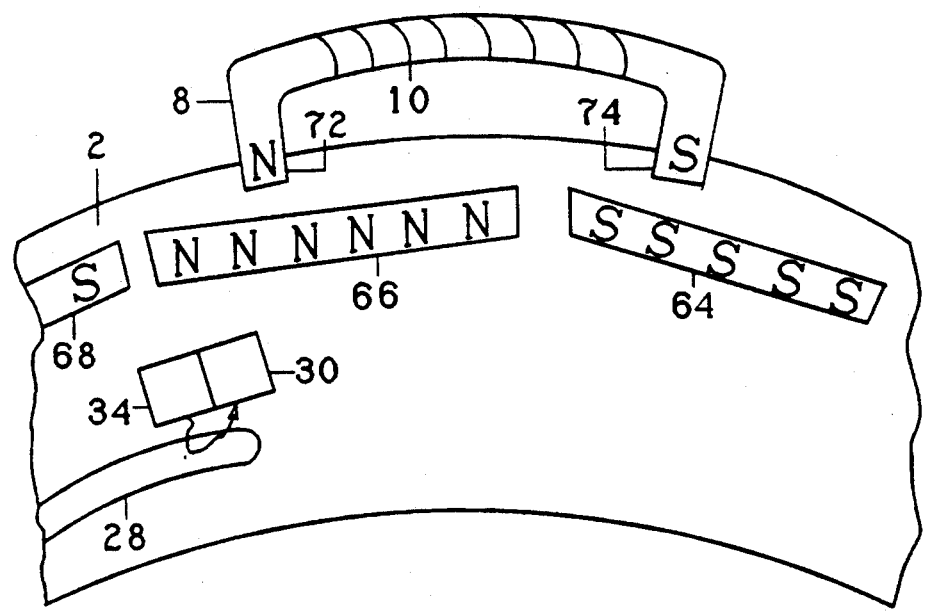
FIGS. 9-11 show a portion of an apparatus according to the invention in operation at three successive points in time.
Figure 10:
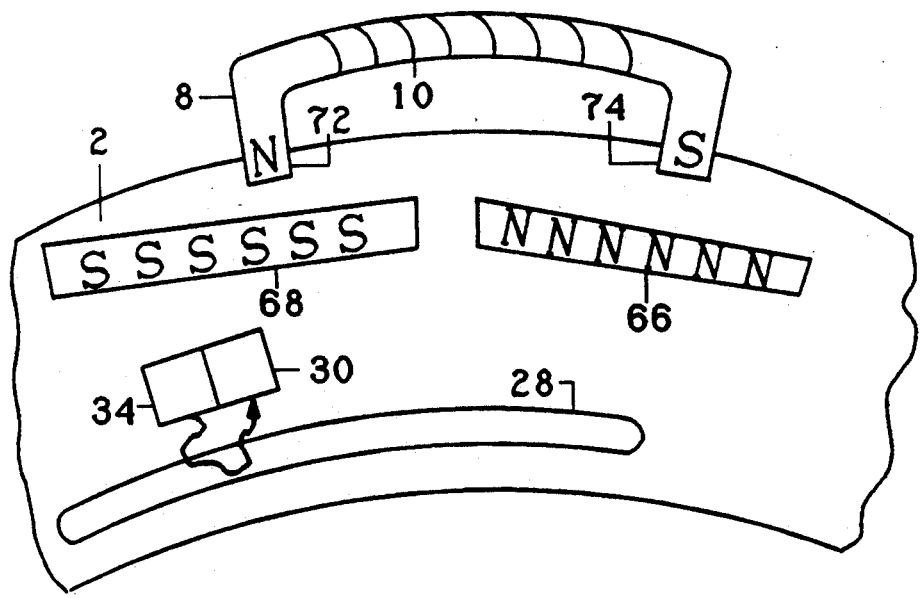
Figure 11:
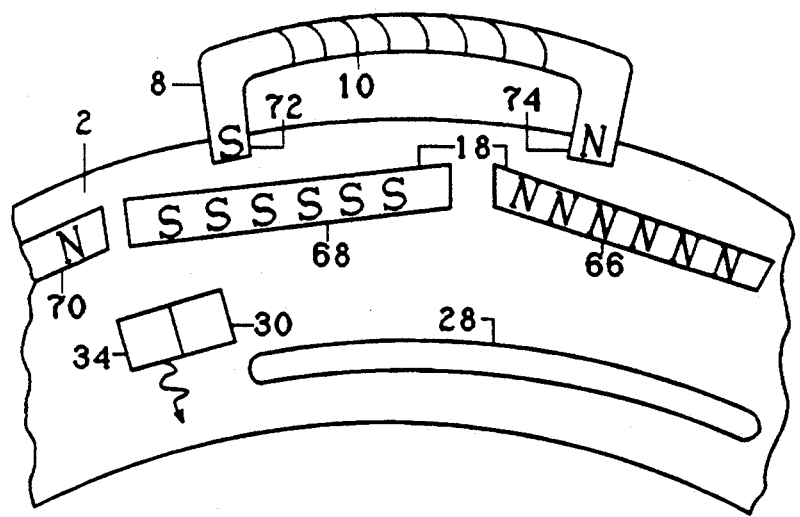

The operation of a preferred embodiment of the invention will now be described in detail with respect to FIGS. 9, 10, and 11. In these three figures, three states of operation of the device are illustrated in chronological order. Throughout, the electromagnet 8 is shown in a stationary position Also, the LED 34 and the photosensitive device 30 are shown schematically in a fixed position. Relative to these stationary devices, the rotor 2 is shown rotating. Permanent magnets rotate along with the rotor 2. In FIGS. 9-11, the rotor 2 is rotating clockwise. Accordingly, FIG. 9 occurs first in time, FIG. 10 occurs slightly thereafter, and FIG. 11 occurs slightly after that.

In FIG. 9, the rotor 2 is carrying magnets shown specifically as 64, 66, and 68 past poles of the electromagnet 8. The rotation of the rotor 2 also has carried a piece of reflective material 28 mounted on the rotor 2 into the path of a beam of light emitted by the LED 34. The light reflects off the reflective material 28 and strikes the photosensitive device 30. In accordance with the operation of the circuits of FIGS. 7 and 8, current flows through the coils 10 on the electromagnet 8 such that a first hole 72 is a north pole and a second pole 74 is a south pole. As shown in FIG. 9, the first pole 72 (north) is to the left of center of the permanent magnet 66 The north pole of the permanent magnet 66 is facing outward, adjacent to the pole 72 of the electromagnet 8. Accordingly, magnetic repulsion is taking place between the magnet 66 and the pole 72. Since the pole 72 is to the left of center, magnetic repulsion between 72 and the magnet 66 urges the magnet 66 and, hence, the rotor 2 to rotate clockwise. Also, the pole 72 is farther away from the magnet 64 than it is from the magnet 68. The two magnets both have south poles both facing outward. Since the pole 72 is closer to the magnet 68 than it is to the magnet 64, magnetic attraction between the pole 72 and the magnet 68 also urges the rotor to rotate clockwise. Through a similar analysis, it will be seen that magnetic attraction and repulsion involving the pole 74 of the electromagnet also urges clockwise rotation.

Turning now to FIG. 10, a small amount of time has elapsed. The magnet 66 has partially overtaken the pole 74 due to clockwise rotation of the rotor 2. The beam of light from the LED 34 continues to impinge on the reflective material 28, causing light to strike the photosensitive device 30. As a consequence, current flowing through the coil 10 is traveling in the same direction as before, and the poles 72 and 74 remain north and south, respectively. There is magnetic attraction between the poles 74 and the magnet 66. Since the pole 74 is to the right of center of the magnet 66, magnetic attraction urges the rotor 2 to rotate clockwise. Similarly, magnetic attraction between the magnet 68 and the first pole 72 also urges clockwise rotation.

Turning now to FIG. 11, another brief time interval has elapsed. The poles 72 and 74 are now to the left of center of the magnets 68 and 66, respectively. If current were still flowing in the coil 10 in the same direction as before, then the pole 72 would still be a north pole and the pole 74 would still be a south pole. Since these poles are to the left of center of the respective permanent magnets, magnetic attraction and repulsion would cause a braking effect or urge counterclockwise rotation of the rotor 2.

However, in accordance with the invention the beam of light from the LED 34 has passed beyond the end of the reflective material 28. The beam of light thus is no longer being reflected onto the photosensitive device 30. By operation of the circuits of FIGS. 7 and 8, current now flows in the opposite direction through the coil 10 as before. The pole 72 is now a south pole, and the pole 74 is now a north pole. In accordance with the prior description of FIGS. 9 and 10, magnetic repulsion between the south pole 72 and the south pole of the magnet 68 urges the rotor 2 to rotate clockwise. Similarly, magnetic attraction between the south pole 72 and north poles of magnets 66 and 70 also urges the rotor 2 to rotate clockwise. The same is true for the pole 74.

Figure 12:
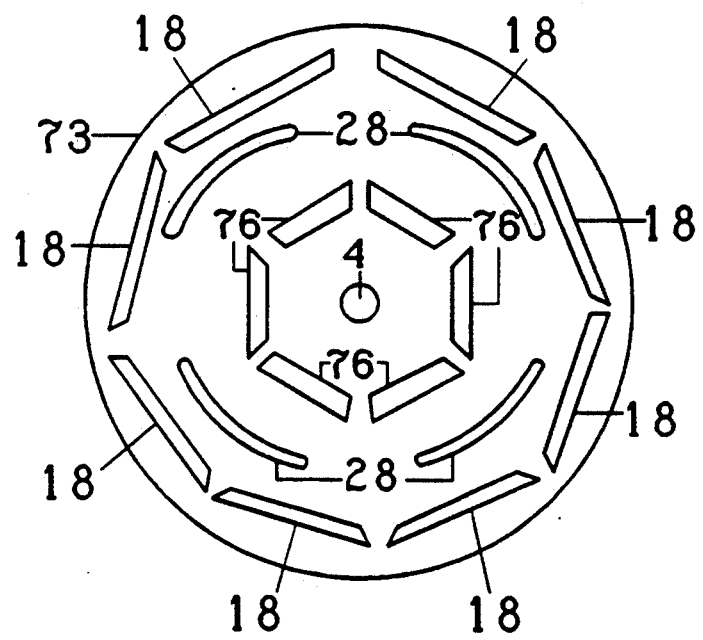
FIG. 12 is a side view of a rotor in accordance with another embodiment of the invention.

While this illustration showed the rotor rotating clockwise, it will be understood that devices in accordance with the invention could be designed to rotate counterclockwise. For such an alternative device, drawings suitably altered, such as by mirror image, from FIGS. 9-11 would illustrate its operation. An apparatus in accordance with the invention may be employed for generating electric current, as well as for producing mechanical motive power. In FIG. 12, there is shown a rotor 73, similar to that of FIG. 2, but further including additional magnets 76. The magnets 76 may be of an essentially similar type to the magnets 18, and may be mounted similarly on the rotor 2. Preferably, the magnets 76 are disposed closer to the axle 4 than the magnets 18. As will be described below, the magnets 76 are used for generating electric power. Since torque is applied to the rotor 2 by magnetic forces between the magnets 18 and the electromagnets 10 as described above, positioning the magnets 76 relative close to the axle 4 facilitates generating electric power.

Figure 13:
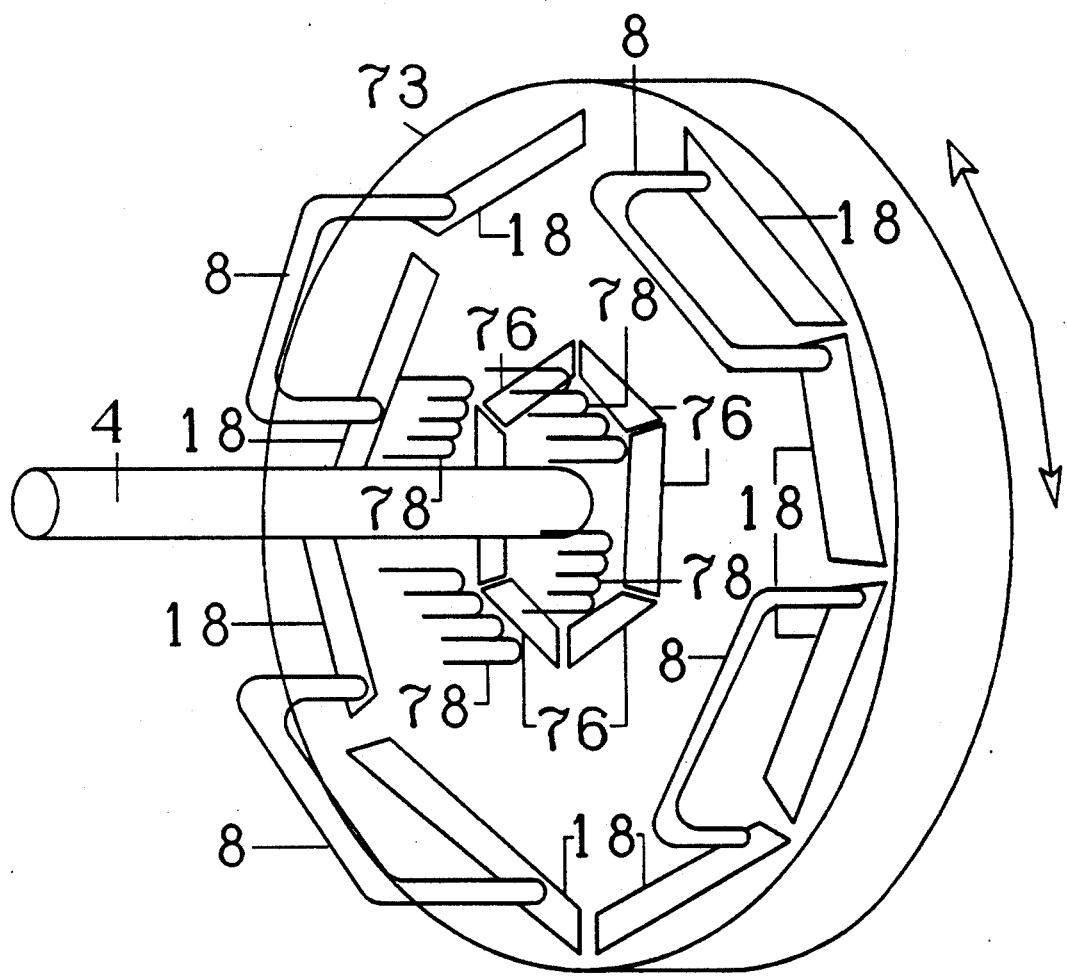
FIG. 13 is a perspective view of an apparatus according to the invention including the rotor of FIG. 12.

Referring to FIG. 13, there is shown a perspective view of the rotor 73 of FIG. 12. Magnets 18 and electromagnets 8 similar to those of the previously described embodiments are shown. To simplify the drawing, the strips of reflective material 28 have been omitted, but it will be understood that they are present in essentially similar configurations to those shown in FIG. 12. The magnets 76 are also shown forming a series end-to-end around the axle 4, as shown in FIG. 12.

It will also be understood that magnets 18 and 76, strips of reflective material 28, electromagnets 8, and other components on or adjacent to the visible face of the rotor 73 in FIGS. 12 and 13 may also be on the opposite face of the rotor 73, although that face is not in view in FIGS. 12 and 13. As the rotor 73 rotates under the influence of magnetic attraction and repulsion between the electromagnets 8 and the permanent magnets 18, the magnets 76 rotate as well. In order to produce electric power, there is provided a plurality of coils 78, which are show in schematic form. The coils 78 are mounted by a suitable means to be positioned adjacent to the magnets 76. Thus, as the magnets 76 rotate along with the rotor 73, by Faraday's law electric current is induced in the coils 78. Six magnets 76 and four coils 78 are shown in the side of the rotor 73 visible in FIG. 12. It will be understood, however, that magnets 76 and coils 78 may be disposed on the other side of the rotor 73 as well. Also, the number and configuration of the magnets 76 and the coils 78 may vary within the spirit and scope of the invention. The coils 78 may be any suitable structure for inducing current from a moving magnetic field. For instance, the coils 78 could be structures similar to the electromagnets 8.

In summary, in accordance with the invention, the reflective material 28 is disposed on the rotor 2 in positions such that reflection or non-reflection of the beam of light from the LED 34 causes current to flow through the coils 10 to cause clockwise rotation of the rotor 2 in a desired direction. It will be understood to one of ordinary skill in the art that the exact number and dimensions of permanent magnets, the exact dimension of the electromagnets 8, the position of the LED 34 and the photosensitive device 30, and the disposition of the reflective material 28 on the rotor 2 may all vary within the spirit and scope of the invention. It is to be understood that those permutations of these parameters which, in combination, provide the ultimate result of a net urging of the rotor in a desired direction for the preponderance of angular positions of the rotor 2 shall fall within the metes and bounds of the invention.

For example, it may be that in alternative embodiments, the angular distance between the poles 72 and 74 of a typical U-shaped electromagnet may not correspond exactly to the angular dimensions of one of the permanent magnets on the rotor 2. In such an alternative embodiment, for instance, the pole 72 of the electromagnet may be exactly centered on a magnet such as the magnet 66, while, due to differing dimensions, the pole 74 is to the right or to the left of center of the adjacent magnet, such as 64. In such a situation, analysis might show that for certain ranges of angular displacement of the rotor 2, a given polarity of the electromagnet 8 might urge rotation of the rotor in one direction, while for other ranges of angular displacement rotation in the opposite direction might be urged. It would be understood from the foregoing that alternative arrangements, such as alternative placement of the reflective material 28, of the LED 34 and the photosensitive device 30, etc., may be taken in order to provide the desired result of a net urging of the rotor 2 in the desired direction for the preponderance of angular positions of the rotor 2. As another alternative embodiment, two LEDS 34 and photosensitive devices 30 could be provided, for instance being disposed onto concentric portions of the rotor 2. In such an alternative embodiment, pieces of reflective material 28 could be positioned on the different concentric portions of the rotor 2 at different angular positions. Such an embodiment might operate to cause current to flow through the coil 10 in one direction part of the time, in a second direction part of the time, and not all part of the time. The embodiment could be employed in order to accommodate foreseeable variations and dimensions of the electromagnet 8 and the permanent magnets.

Thus, reviewing the respective electromagnetic motor and combined electromagnetic motor and generator embodiments of the present invention, described above with reference to FIGS. 1-13, an electromagnetic motor in accordance with an embodiment of the present invention comprises a generally disc-shaped rotor 2 mounted for rotation about an axis/axle 4. A plurality of generally elongate permanent magnets 18 are mounted (via slots 16) on the rotor in a generally end to end arrangement, so as to form a generally polygonal distribution of permanent magnets about the axis 4. A first elongated face of each of the permanent magnets 18 has a north magnetic polarity and a second elongated face of each of the permanent magnets has a south magnetic polarity. Within the generally polygonal distribution of the magnets of the plurality, alternate ones of the permanent magnets have their first faces of north magnetic polarity facing outwardly from the rotor, and alternate others of the permanent magnets, which are located between the alternate ones of the permanent magnets, have their second faces of the south magnetic polarity facing outwardly from the rotor, as shown diagrammatically in FIG. 2, for example. As a result, as one proceeds around the generally polygonal distribution of the plurality of permanent magnets, one successively encounters an alternating distribution of north and south faces of the plurality of generally elongate permanent magnets 18.

A plurality of electromagnets 8 are supported with respect to the rotor 2, such that at least one pole of a respective electromagnet 8 is disposed adjacent to the generally polygonal distribution of the plurality of generally elongate permanent magnets 18 that are mounted on the rotor. As described above with respect to FIGS. 9, 10 and 11, and as shown in FIG. 13, the plurality of electromagnets 8 are arranged such that, as the rotor rotates about its axis, whenever a respective one of the permanent magnets 18 becomes juxtaposed with a pole of a respective electromagnet 8, both the magnetic polarity of the pole of the respective electromagnet is maintained and only the pole of the respective electromagnet is juxtaposed with the respective one of the permanent magnets during the entirety of travel of the respective one of the permanent magnets past the pole of the respective electromagnet. Upon completion of travel of the respective one of the permanent magnets past the pole of the respective electromagnet, the magnetic polarity of the respective electromagnet is changed to an opposite magnetic polarity, in association with the one pole of the respective electromagnet becoming juxtaposed with a respective another of the permanent magnets, an outwardly facing elongated face of which has a magnetic polarity opposite to the magnetic polarity of the outwardly facing elongated face of the respective one of the permanent magnets.

The electromagnetic motor in accordance with the present invention also includes an electromagnet energization circuit, shown in detail in FIG. 8, which is coupled to the plurality of electromagnets and is operative to controllably supply energizing current to the plurality of electromagnets such that poles thereof which are juxtaposed to respective ones of the permanent magnets are of the same magnetic polarity of the juxtaposed permanent magnets, so as to cause magnetic repulsion of juxtaposed permanent magnets and thereby drive the rotor about its axis.

In accordance with the embodiment of the invention, shown in FIG. 13, both an electromagnetic motor and generator are provided in the same apparatus. The combined electromagnetic motor and generator comprises a rotor 73 mounted for rotation about an axis 4. A first plurality of generally elongate permanent magnets 18 are mounted on the rotor in a generally end to end arrangement, so as to form a first generally polygonal distribution of permanent magnets about the axis. A first elongated face of each of the permanent magnets 18 has a north magnetic polarity and a second elongated face of each of the permanent magnets has a south magnetic polarity. Within the first generally polygonal distribution of permanent magnets, alternate ones of the permanent magnets 18 have their first faces of north magnetic polarity facing outwardly from the rotor and alternative others of the permanent magnets, which are located between the alternate ones of the permanent magnets, have their second faces of south magnetic polarity facing outwardly from the rotor. As a result, as one proceeds around the first generally polygonal distribution of the plurality of permanent magnets, one successively encounters an alternating distribution of north and south faces of the plurality of generally elongate permanent magnets.

A plurality of electromagnets 8 is supported with respect to the rotor 73, such that at least one pole of a respective electromagnet is disposed adjacent to the first generally polygonal distribution of generally elongate plurality of permanent magnets that are mounted on the rotor. The plurality of electromagnets 8 are arranged such that, as the rotor rotates about is axis, whenever a respective one of the permanent magnets 18 becomes juxtaposed with a pole of a respective electromagnet 8, both the magnetic polarity of the pole of the respective electromagnet is maintained and only the pole of the respective electromagnet is juxtaposed with the respective one of the permanent magnets during the entirety of the travel of the respective one of the permanent magnets past the pole of the respective electromagnet. Upon completion of the travel of the respective one of the permanent magnets past the pole of the respective electromagnet, the magnetic polarity of the respective electromagnet is changed to an opposite magnetic polarity, in association with the one pole of the respective electromagnet becoming juxtaposed with a respective another of the permanent magnets, the outwardly facing elongated face of which has a magnetic polarity opposite to the magnetic polarity of the outwardly facing elongated face of the respective one of the permanent magnets.

An electromagnet energization circuit, such as shown in FIG. 8 described above, is coupled to the plurality of electromagnets 8 and is operative to controllably supply energizing current to the plurality of electromagnetics, such that poles thereof which are juxtaposed to respective ones of the permanent magnets have the same magnetic polarity of the juxtaposed permanent magnets, so as to cause magnetic repulsion of juxtaposed permanent magnets and thereby drive the rotor about its axis.

A second plurality of generally elongate permanent magnets 76 is mounted on the rotor in a generally end to end arrangement, so as to form a second generally polygonal distribution of permanent magnets about the rotor axis. The second generally polygonal distribution of permanent magnets 76 is closer to the axis of the rotor 73 than the first generally polygonal distribution of permanent magnets 18, as shown in FIG. 13. A first elongated face of each permanent magnet 76 of the second plurality has a north magnetic polarity and a second elongated face of each the permanent magnets of the second plurality has a south magnetic polarity. Within the second generally polygonal distribution of permanent magnets, alternate ones of the permanent magnets of the second plurality have their first faces of north magnetic polarity facing outwardly from the rotor and alternate others of the permanent magnets of the second plurality, which are located between alternate ones of the permanent magnets of the second plurality, have their second faces of south magnetic polarity facing outwardly from the rotor. As a result, as one proceeds around the second generally polygonal distribution of permanent magnets, one successively encounters an alternating distribution of north and south faces of the second plurality of generally elongate permanent magnets.

A plurality of electromagnetically responsive coils 78 are supported with respect to the rotor 73, so as to be disposed adjacent to the second generally polygonal distribution of the plurality of permanent magnets 76 that are mounted on the rotor. As the rotor rotates about its axis, the travel of the permanent magnets of the second plurality past the plurality of electromagnetically responsive coils induces current flow in the coils, so that electric power may be derived therefrom.

The system in accordance with the invention as described above would be capable of achieving a high speed of rotation of the rotor 2. The apparatus would be "closed loop" system in that changes in the current flow through the coil 10 to produce changes in the polarity of the electromagnet 8 would result from angular displacement of the rotor 2. During a time interval in which the photosensitive device 30 either is or is not receiving light, current will continuously flow through the coils 10. The direction of flow depends on whether the device 30 is receiving the light. By contrast, during time intervals when the beam of light from the LED 34 passes from a region of reflective material 28 to a region in which there is no such material or visa versa, transitions will take place in which current flow through the coil 10 is momentarily stopped. The faster the speed at which the rotor 2 rotates, the more frequently such time intervals will take place. Accordingly, overall system power consumption will tend to go down as the speed of rotation of the rotor 2 increases.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An electromagnetic motor comprising:
   a rotor mounted for rotation about an axis;
   a plurality of generally elongate permanent magnets mounted on said rotor in a generally end to end arrangement, so as to form a generally polygonal distribution of said permanent magnets about said axis, a first elongated face of each of said permanent magnets having a north magnetic polarity and a second elongated face of each of said permanent magnets having a south magnetic polarity, and wherein, within the generally polygonal distribution of the magnets of said plurality, alternate ones of said permanent magnets have their first faces of said north magnetic polarity facing outwardly from said rotor and alternate others of said permanent magnets, which are located between said alternate ones of said permanent magnets, have their second faces of said south magnetic polarity facing outwardly from said rotor, so that, as one proceeds around said generally polygonal distribution of said plurality of permanent magnets, one successively encounters an alternating distribution of north and south faces of said plurality of generally elongate permanent magnets;

a plurality of electromagnets supported with respect to said rotor such that at least one pole of a respective electromagnet is disposed adjacent to said generally polygonal distribution of said plurality of generally elongated permanent magnets that are mounted on said rotor, and wherein said plurality of electromagnets are arranged such that as said rotor rotates about said axis, whenever a respective one of said permanent magnets becomes juxtaposed with a pole of a respective electromagnet, both a magnetic polarity of said pole of said respective electromagnet is maintained and only said pole of said respective electromagnet is juxtaposed with said respective one of said permanent magnets during the entirety of travel of said respective one of said permanent magnets past said pole of said respective electromagnet, and wherein, upon completion of the travel of said respective one of said permanent magnets past said pole of said respective electromagnet, the magnetic polarity of said respective electromagnet is changed to an opposite magnetic polarity, is association with said one pole of said respective electromagnet becoming juxtaposed with a respective another of said permanent magnets, an outwardly facing elongated face of which has a magnetic polarity opposite to the magnetic polarity of an outwardly facing elongated face of said respective one of said permanent magnets; and an electromagnet energization circuit coupled to said plurality of electromagnets and being operative to controllably supply energizing current to said plurality of electromagnets such that poles thereof which are juxtaposed to respective ones of said permanent magnets are of the same magnetic polarity of the juxtaposed permanent magnets, so as to cause magnetic repulsion of the juxtaposed permanent magnets and thereby drive said rotor about said axis.

2. An electromagnetic motor according to claim 1, wherein the magnetic polarity of said pole of said respective electromagnet is controlled so as to be the same as the magnetic polarity of the outwardly facing elongated face of a respective permanent magnet that is juxtaposed therewith.

3. An electromagnetic motor according to claim 1, wherein a respective electromagnet comprises a generally U-shaped electromagnet having first and second poles of opposite magnetic polarities, said first and second poles being spaced apart from the one another by a distance proximate to a separation between corresponding locations of successively adjacent ones of said permanent magnets within the generally polygonal distribution thereof on said rotor, such that the first and second poles of said respective electromagnet are respectively juxtaposed with successively adjacent ones of said permanent magnets.

4. An electromagnetic motor according to claim 3, wherein the magnetic polarity of said pole of said respective electromagnet is controlled so as to be the same as the magnetic polarity of the outwardly facing elongated face of a respective permanent magnet that is juxtaposed therewith.

5. An electromagnetic motor comprising:

a generally disc-shaped rotor mounted for rotation about an axis;

a first plurality of generally elongate permanent magnets mounted on one side of said generally disc-shaped rotor in a generally end to end arrangement, so as to form a generally polygonal distribution of said permanent magnets about said axis, a first elongated face of each of said first permanent magnets having a north magnetic polarity and a second elongated face of each of said first permanent magnets having a south magnetic polarity, and wherein, within the generally polygonal distribution of the first permanent magnets of said first plurality, alternate ones of said first permanent magnets have their first faces of said north magnetic polarity facing outwardly from said one side of said generally disc-shaped rotor and alternate others of said first permanent magnets, which are located between said alternate ones of said first permanent magnets, have their second faces of said south magnetic polarity facing outwardly from said one side of said generally disc-shaped rotor, so that, as one proceeds around said generally polygonal distribution of said first plurality of generally elongate first permanent magnets, one successively encounters an alternating distribution of north and south faces of said first plurality of generally elongate permanent magnets;

a second plurality of generally elongated second permanent magnets mounted on a second side of said generally disc-shaped rotor, opposite to the one side thereof in a generally end to end arrangement, so as to form a generally polygonal distribution of said second permanent magnets about said axis, a first elongated face of each of said second permanent magnets having a north magnetic polarity and a second elongated face of each of said second generally elongate permanent magnets having a south magnetic polarity, and wherein, within the generally polygonal distribution of said plurality of second permanent magnets, alternate ones of said second permanent magnets have their first faces of said north magnetic polarity facing outwardly from said second side of said generally disc-shaped rotor and alternate others of said second permanent magnets, which are located between said alternate ones of said second permanent magnets, have their second faces of said south magnetic polarity facing outwardly from said second side of said generally disc-shaped rotor, so that, as one proceeds around said generally polygonal distribution of said plurality of second permanent magnets, one successively encounters an alternating distribution of north and south faces of said plurality of generally elongate second permanent magnets;

a first plurality of first electromagnets supported with respect to said one side of said generally disc-shaped rotor such that at least one pole of a respective first electromagnet is disposed adjacent to said generally polygonal distribution of said first plurality of first permanent magnets that are mounted on said one side of said generally disc-shaped rotor, and wherein said first plurality of first electromagnets are arranged such that as said generally disc-shaped rotor rotates about said axis, whenever a respective one of said first permanent magnets becomes juxtaposed with a pole of said respective first electromagnet, both the magnetic polarity of said pole of said respective first electromagnet is maintained and only said pole of said respective first electromagnet is juxtaposed with said respective one of said first permanent magnets during entirety of travel of said respective one of said first permanent magnets past said pole of said first respective first electromagnet, and whereon, upon completion of the travel of said respective one of said first permanent magnets past said hole of said respective first electromagnet, the magnetic polarity of said first respective electromagnet is change to an opposite magnetic polarity, in association with said one pole of said respective first electromagnet becoming juxtaposed with a respective another of said first permanent magnets, an outwardly facing elongated face of which has a magnetic polarity opposite to the magnetic polarity of an outwardly facing elongated face of said respective one of said first permanent magnets;

a second plurality of second electromagnets supported with respect to said one side of said generally disc-shaped rotor such that at least one pole of a respective second electromagnet is disposed adjacent to said generally polygonal distribution of said second plurality of generally elongate second permanent magnets that are mounted on said one side of said generally disc-shaped rotor, and wherein said second plurality of generally elongate second electromagnets are arranged such that as said generally disc-shaped rotor rotates about said axis, whenever a respective one of said second permanent magnets becomes juxtaposed with a pole of a respective second electromagnet, both a magnetic polarity of said pole of said respective second electromagnet is maintained and only said pole of said respective second electromagnet is juxtaposed with said respective one of said second permanent magnets during the entirety of the travel of said respective one of said second permanent magnets past said pole of said respective second electromagnet, and wherein, upon completion of the travel of said respective one of said second permanent magnets past said pole of said respective second electromagnet, the magnetic polarity of said second respective electromagnet is changed to an opposite magnetic polarity, in association with said one pole of said respective second electromagnet becoming juxtaposed with a respective another of said second permanent magnets, an outwardly facing elongated face of which has a magnetic polarity opposite to the magnetic polarity of the outwardly facing elongated face of said respective one of said second permanent magnets; and an electromagnet energization circuit coupled to said generally elongate first and second pluralities of electromagnets and being operative to controllably supply energizing current to said first and second pluralities of electromagnets such that poles thereof which are juxtaposed to respective ones of said first and second permanent magnets, respectively, are of the same magnetic polarity of the juxtaposed first and second permanent magnets, so as to cause magnetic repulsion of said juxtaposed first and second pluralities of first and second permanent magnets and thereby drive said generally disc-shaped rotor about said axis.

6. An electromagnetic motor according to claim 5, wherein the magnetic polarity of said pole of said respective first or second electromagnet is controlled so as to be the same as the magnetic polarity of the outwardly facing elongated face of a respective first or second permanent magnet that is juxtaposed therewith.

7. An electromagnetic motor according to claim 5, wherein a respective first or second electromagnet comprises a generally U-shaped electromagnet having first and second poles of opposite magnetic polarities, said first and second poles being spaced apart from the one another by a distance proximate to a separation between corresponding locations of successively adjacent ones of said first or second permanent magnets within the generally polygonal distribution thereof on a side of said generally disc-shaped rotor, such that the first and second poles of a respective first or second electromagnet are respectively juxtaposed with successively adjacent ones of said first or second permanent magnets.

8. An electromagnetic motor according to claim 7, wherein the magnetic polarity of said pole of said respective first or second electromagnet is controlled so as to be the same as the magnetic polarity of the outwardly facing elongated face of a respective first or second permanent magnet that is juxtaposed therewith.

9. An electromagnetic motor comprising:
a rotor mounted for rotation about an axis;
a first plurality of generally elongate permanent magnets mounted on said rotor in a generally end to end arrangement, so as to form a first generally polygonal distribution of said permanent magnets about said axis, a first elongated face of each of said permanent magnets having a north magnetic polarity and a second elongated face of each of said permanent magnets having a south magnetic polarity, and wherein, within said first generally polygonal distribution of the permanent magnets of said plurality, alternate ones of said permanent magnets have their first faces of said north magnetic polarity facing outwardly from said rotor and alternate others of said permanent magnets, which are located between said alternate ones of said permanent magnets, have their second faces of said south magnetic polarity facing outwardly from said rotor, so that, as one proceeds around said first generally polygonal distribution of said plurality of permanent magnets, one successively encounters an alternating distribution of north and south faces of said plurality of generally elongate permanent magnets;
a plurality of electromagnets supported with respect to said rotor such that at least one pole of a respective electromagnet is disposed adjacent to said first generally polygonal distribution of said generally elongate plurality of permanent magnets that are mounted on said rotor, and wherein said plurality of electromagnets are arranged such that as said rotor rotates about said axis, whenever a respective one of said permanent magnets becomes juxtaposed with a pole of a respective electromagnet, both a magnetic polarity of said pole of said respective electromagnet is maintained and only said pole of said respective electromagnet is juxtaposed with said respective one of said permanent magnets during the entirety of the travel of said respective one of said permanent magnets past said pole of said respective electromagnet, and wherein, upon completion of the travel of said respective one of said permanent magnets past said pole of said respective electromagnet, the magnetic polarity of said respective electromagnet is changed to an opposite magnetic polarity, is association with said one pole of said respective electromagnet becoming juxtaposed with a respective another of said permanent magnets, the outwardly facing elongated face of which has a magnetic polarity opposite to the magnetic polarity of an outwardly facing elongated face of said respective one of said permanent magnets;

an electromagnet energization circuit coupled to said plurality of electromagnets and being operative to controllably supply energizing current to said plurality of electromagnets such that poles thereof which are juxtaposed to respective ones of said permanent magnets have the magnetic polarity of the juxtaposed permanent magnets, so as to cause magnetic repulsion of said juxtaposed permanent magnets and thereby drive said rotor about said axis;

a second plurality of generally elongate permanent magnets mounted on said rotor in a generally end to end arrangement, so as to form a second generally polygonal distribution of permanent magnets about said axis, said second generally polygonal distribution of permanent magnets being closer to the axis of said rotor than said first generally polygonal distribution of permanent magnets, a first elongated face of each permanent magnet of said second plurality having a north magnetic polarity and a second elongated face of each the permanent magnets of said second plurality having a south magnetic polarity, and wherein, within the second generally polygonal distribution of permanent magnets, alternate ones of the permanent magnets of said second plurality have their first faces of said north magnetic polarity facing outwardly from said rotor and alternate others of the permanent magnets of said second plurality, which are located between said alternate ones of the permanent magnets of said second plurality, have their second faces of said south magnetic polarity facing outwardly from said rotor, so that, as one proceeds around said second generally polygonal distribution of permanent magnets, one successively encounters an alternating distribution of north and south faces of said second plurality of generally elongate permanent magnets; and a plurality of electromagnetically responsive coils, supported with respect to said rotor so as to be disposed adjacent to said second generally polygonal distribution of said plurality of permanent magnets that are mounted on said rotor, so that, as said rotor rotates about said axis, the travel of the permanent magnets of said second plurality past said plurality of electromagnetically responsive coils induces current flow in said coils, so that electric power may be derived therefrom.

10. An electromagnetic motor and generator according to claim 9, wherein the magnetic polarity of a pole of a respective electromagnet of said first plurality is controlled so as to be the same as the magnetic polarity of an outwardly facing elongated face of a respective permanent magnet of said first plurality that is juxtaposed therewith.

11. An electromagnetic motor and generator according to claim 10, wherein a said respective electromagnet of said first plurality comprises a generally U-shaped electromagnet having first and second poles being spaced apart from one another by a distance proximate to a separation between corresponding locations of successively adjacent ones of said permanent magnets within said first generally polygonal distribution thereof on said rotor, such that the first and second poles of said respective electromagnet of said first plurality are respectively juxtaposed with successively adjacent ones of said permanent magnets.

* * * * *